March 20, 1928.
G. L. GESSNER
COFFEEPOT
Filed March 7, 1927
1,663,162
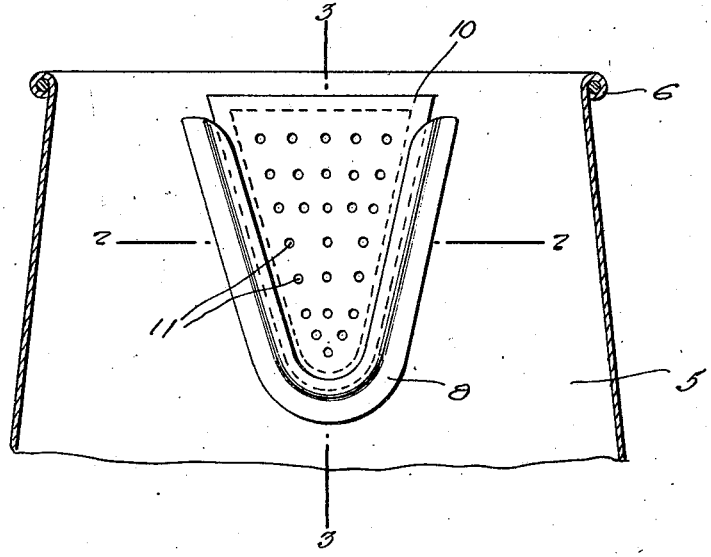
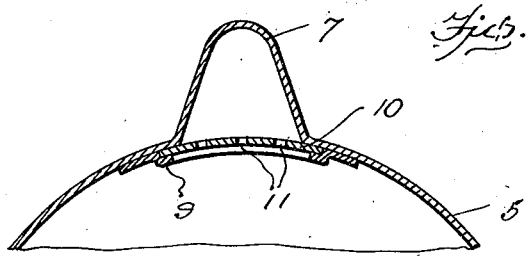
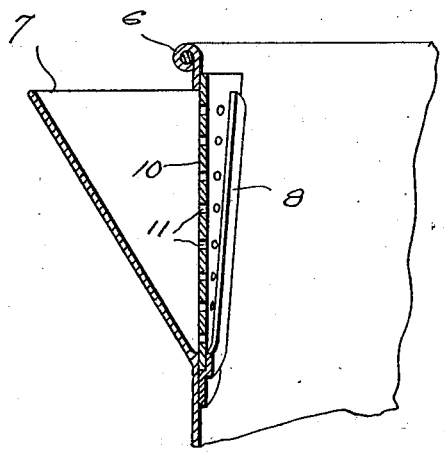
Inventor
George L. Gessner
By Clarence A. O'Brien
Attorney Patented Mar. 20, 1928.

1,663,162

UNITED STATES PATENT OFFICE.

GEORGE L. GESSNER, OF TOLEDO, OHIO.

COFFEEPOT.

Application filed March 7, 1927. Serial No. 173,573.

This invention relates to new and useful improvements in coffee pots and has for its primary object to provide a pot equipped with a readily removable strainer plate back of the pouring spout of the pot so as to permit said plate to be cleaned or to permit plates having openings of various sizes to be inserted within the pot.

With the foregoing and other objects in view as the nature of the invention will be better understood, the same comprises the novel form, combination and arrangement of parts hereinafter more fully described, shown in the accompanying drawing and claimed.

In the drawing wherein like numerals of reference indicate corresponding parts throughout the several views:

Figure 1 is a fragmentary section through a coffee pot constructed in accordance with the present invention, and Figures 2 and 3 are vertical and horizontal sections taken respectively upon the lines 2—2 and 3—3 of Figure 1.

Now having particular reference to the drawing, 5—5 indicates a generally conventional coffee pot having a rolled and reinforced upper edge 6 and being equipped adjacent said upper edge with a pouring spout 7 communicating with the interior of the pot as clearly disclosed in Figures 2 and 3.

In carrying out the present invention there is arranged upon the interior of the pot around the pouring spout 7 a relative V-shaped strip of metal 8, the inner edge of which is formed with an inwardly offset flange 9 to provide a guide channel between said metallic strip and the coffee pot proper.

The invention further consists of a strainer plate 10 slightly curved in a transverse direction so as to conform to the curvature of the pot 5 as clearly disclosed in Figure 2. Furthermore, this plate 10 is of tapering formation toward its upper edge and is provided with strainer openings 11 of a predetermined number and size within the edges thereof, the side and lower edges of this plate adapted for sliding engagement within the offset flange 8 at the inner edge of the guide strip 8. If desired, a plurality of these plates may be dispensed with each coffee pot, the various plates having different sized openings therein depending upon the size of the coffee grains being used.

It will thus be seen that a coffee pot equipped with a strainer plate of this character may be readily and thoroughly cleaned and wherein the strainer plate may be readily removed when the same becomes worn or damaged.

Having thus described the invention, what I claim is:—

In a coffee pot of the class described, wherein the same is formed with a substantially triangular shaped opening in the side wall thereof adjacent its upper edge, and from which extends a pouring spout; a relatively V-shaped metallic strip secured to the inner face of the wall of the pot and surrounding the triangular opening, the inner edge portion of the strip being bent inwardly and thence laterally to provide a V-shaped offset and a similar shaped retaining flange, the edge of said flange terminating beyond the adjacent side edges of the opening formed in the side edges of the pot, and a triangular shaped plate formed with a series of openings and being curved transversely throughout its length to conform to the contour of the pot, said plate being of greater dimensions than the triangular openings and being adapted for detachable disposition between the inner wall of the pot and said V-shaped flange, the side edges of the plate engaging the offset portions of the V-shaped strip, the upper edge of the plate extending beyond the upper ends of the V-shaped strip and terminating below the upper edge of the coffee pot.

In testimony whereof I affix my signature.

GEORGE L. GESSNER.